US006419352B1

(12) United States Patent
Kubota et al.

(10) Patent No.: US 6,419,352 B1
(45) Date of Patent: Jul. 16, 2002

(54) REACTION SOLUTION FOR INK JET RECORDING AND INK JET RECORDING METHOD USING THE SAME

(75) Inventors: Kazuhide Kubota; Reiko Hori, both of Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/314,385

(22) Filed: May 19, 1999

(30) Foreign Application Priority Data

May 20, 1998 (JP) .......................................... 10-138911
Apr. 20, 1999 (JP) .......................................... 11-112520

(51) Int. Cl.⁷ ................................................. B41J 2/17
(52) U.S. Cl. ....................................................... 347/96
(58) Field of Search ............................ 347/96, 100, 98, 347/101; 106/31.23, 31.6, 31.13

(56) References Cited

U.S. PATENT DOCUMENTS

| 5,387,440 A | * | 2/1995 | Takemoto et al. | ........ 427/443.1 |
| 5,734,403 A | | 3/1998 | Suga et al. | ................. 347/101 |
| 5,746,818 A | * | 5/1998 | Yatake | .................... 106/31.86 |
| 6,280,513 B1 | * | 8/2001 | Osumi et al. | .............. 106/31.6 |

FOREIGN PATENT DOCUMENTS

| EP | 0534634 | 3/1993 |
| EP | 0739743 | 10/1996 |
| EP | 0761783 | 3/1997 |
| JP | 5628256 | 3/1981 |
| JP | 63299970 | 12/1988 |
| JP | 356573 | 3/1991 |
| JP | 379678 | 4/1991 |
| JP | 3160068 | 7/1991 |
| JP | 418462 | 1/1992 |

OTHER PUBLICATIONS

Patent Abstracts of Japan of 3079678 Dated Apr. 4, 1991.
Patent Abstracts of Japan of 3160068 Dated Jul. 10, 1991.
Patent Abstracts of Japam of 4018462 Dated Jan. 22, 1992.
Patent Abstracts of Japan of 56028256 Dated Mar. 19, 1981.
Patent Abstracts of Japan of 63299970 Dated Dec. 7, 1988.
Patent Abstracts of Jpan of 3056573 Dated Mar. 12, 1991.

* cited by examiner

*Primary Examiner*—John Barlow
*Assistant Examiner*—Michael S Brooke
(74) *Attorney, Agent, or Firm*—Ladas & Parry (57) ABSTRACT

Disclosed is a reaction solution for an ink jet recording method wherein droplets of an ink composition and droplets of a reaction solution, which produces an agglomerate upon contact with the ink composition, are ejected and deposited onto a recording medium to perform printing. The reaction solution can realize good print quality and possesses excellent storage stability and ejection stability. Specifically, it has been found that use of a reaction solution comprising at least a polyvalent metal salt, ammonia, and benzotriazole or a benzotriazole derivative in an ink jet recording method, wherein two liquids are printed, can realized good print quality and that the reaction solution possesses excellent storage stability and ejection stability. Further, it has been found that this reaction solution does not attack a nozzle plate having thereon a eutectoid plating and enables stable printing for a long period of time. Thus, the reaction solution of the present invention comprises at least a polyvalent metal salt, ammonia, and benzotriazole or a benzotriazole derivative.

19 Claims, 3 Drawing Sheets

REACTION SOLUTION FOR INK JET RECORDING AND INK JET RECORDING METHOD USING THE SAME

BACKGROUND OF THE INVENTION

1. Field of the Invention

The present invention relates to an ink jet recording method, and more particularly to an ink jet recording method wherein two liquids of a reaction solution and an ink composition are deposited onto a recording medium to perform printing.

2. Background Art

Ink jet recording is a printing method wherein droplets of an ink composition are ejected and deposited onto a recording medium such as paper to perform printing. This method has a feature that images having high resolution and quality can be printed at a high speed by means of relatively inexpensive apparatuses. In general, the ink composition used in the ink jet recording comprises water as a main component and, added thereto, a colorant and a wetting agent, such as glycerin, for preventing clogging and other purposes.

On the other hand, regarding the ink jet recording method, the application of a polyvalent metal salt solution onto a recording medium followed by the application of an ink composition containing a dye having at least one carboxyl group has been recently proposed (for example, Japanese Patent Laid-Open No. 202328/1993). The claimed advantage of this method is that the polyvalent metal ion combines with the dye to form an insoluble complex, the presence of which can offer an image having good waterfastness and high quality free from color bleeding.

Further, the use of a color ink comprising at least a surfactant for imparting a penetrating property or a solvent having a penetrating property and a salt in combination with a black ink capable of being thickened or agglomerated through the action of the salt has been proposed in the art (Japanese Patent Laid-Open No. 106735/1994). The claimed advantage of this method is that high-quality color images having high image density and free from color bleeding can be yielded. Furthermore, Japanese Patent No. 2675001 proposes a recording method wherein a reaction solution containing a polyvalent metal salt and a dye ink containing an anionic group are deposited. Specifically, ink jet recording methods have been proposed wherein two liquids, a first liquid containing a salt and a second liquid of an ink composition, are printed to realize good images.

Furthermore, an ink jet recording method has also been proposed wherein a reaction solution containing a polyvalent metal salt and an ink composition containing a resin emulsion are deposited onto recording media to perform printing (Japanese Patent Laid-Open No. 9-207424).

SUMMARY OF THE INVENTION

The present inventors have now found that use of a reaction solution comprising at least a polyvalent metal salt, ammonia, and benzotriazole or a benzotriazole derivative in an ink jet recording method, wherein two liquids are printed, can realize good print quality and that the reaction solution possesses excellent storage stability and ejection stability. Furthermore, it has been found that this reaction solution does not attack a nozzle plate having thereon a eutectoid plating and use of the reaction solution in combination with an ink jet recording head provided with the nozzle plate having thereon a eutectoid plating enables stable printing without posing a problem of corrosion of the recording head for a long period of time. The present invention has been made based on such finding.

Accordingly, it is an object of the present invention to provide a reaction solution which, when used in an ink jet recording method wherein two liquids are printed, can realize good print quality and, at the same time, possesses excellent storage stability and ejection stability.

It is another object of the present invention to provide an ink jet recording method, wherein two liquids are printed, using the reaction solution according to the present invention.

According to one aspect of the present invention, there is provided a reaction solution for an ink jet recording method wherein droplets of an ink composition and droplets of a reaction solution, which produces an agglomerate upon contact with the ink composition, are ejected and deposited onto a recording medium to perform printing, the reaction solution comprising at least a polyvalent metal salt, ammonia, and benzotriazole or a benzotriazole derivative.

According to another aspect of the present invention, there is provided an ink jet recording method comprising the steps of: ejecting droplets of an ink composition and droplets of a reaction solution which produces an agglomerate upon contact with the ink composition; and depositing the droplets of the ink composition and the droplets of the reaction solution onto a recording medium to perform printing, wherein the reaction solution is one according to the present invention.

DESCRIPTION OF THE PREFERRED EMBODIMENTS

Ink Jet Recording Method

The ink jet recording method according to the present invention comprises the step of printing a reaction solution and an ink composition on a recording medium.

According to the ink jet recording method of the present invention, good printing can be realized by bringing the reaction solution into contact with the ink composition. Although the present invention is not intended to be bound by the theory, the reason why good printing can be achieved by the present invention is believed as follows. Upon contact of the reaction solution with the ink composition, the polyvalent metal salt contained in the reaction solution breaks the state of dispersion of a colorant and other ingredients contained in the ink composition, resulting in agglomeration of these ingredients. The resultant agglomerates are considered to inhibit the penetration of the colorant into the recording medium. It is considered that this results in the formation of images having high color density and free from feathering and uneven printing. Further, in color images, uneven color mixing in boundaries of different colors, that is, color bleeding, can also be advantageously prevented. The above mechanism is merely hypothetical, and the present invention should not be construed to be limited by this theory.

According to the present invention, the reaction solution contains, in addition to the polyvalent metal salt, ammonia and benzotriazole or a benzotriazole derivative. This reaction solution possesses excellent ejection stability and storage stability. Further, as described above, the polyvalent metal salt is considered to break the state of dispersion of a colorant and other ingredients contained in the ink composition, resulting in agglomeration of these ingredients. Printing using a reaction solution containing the polyvalent metal salt for a long period of time, however, has resulted in a failure to perform stable printing. This has been considered attributable to the fact that a nozzle plate, which has been rendered water repellent by eutectoid plating, was attacked by the polyvalent metal salt. Ammonia and benzotriazole or a benzotriazole derivative appears to effectively inhibit this attack, and this is considered to realize stable ejection of the reaction solution for a long period of time. However, it should be noted that the above mechanism is merely hypothetical, and the present invention should not be construed to be limited by this mechanism.

The reaction solution and the ink composition may be applied on a recording medium in any sequence. Specifically, any of the following methods may be suitably used: a method wherein a reaction solution is first deposited onto a recording medium followed by deposition of an ink composition onto the recording medium with the reaction solution deposited thereon; a method wherein an ink composition is first printed followed by deposition of the reaction solution; and a method wherein a reaction solution and an ink composition are mixed together immediately before or immediately after ejection thereof.

The deposition of the reaction solution onto the recording medium may be carried out by any of a method wherein the reaction solution is selectively deposited onto only an area where the ink composition is deposited, and a method wherein the reaction solution is deposited on the whole area of the paper. The former method is cost-effective because the consumption of the reaction solution can be minimized. In this method, however, the accuracy of the position at which both the reaction solution and the ink composition are deposited should be high to some extent. On the other hand, in the latter method, as compared with the former method, the requirement for the accuracy of the position where the reaction solution and the ink composition are deposited is not strict. In the latter method, however, a large amount of the reaction solution should be deposited on the whole area of the paper. This is likely to create curling of the paper at the time of drying. For this reason, the method used may be determined by taking a combination of the ink composition with the reaction solution into consideration. In the former method, the reaction solution can be deposited by ink jet recording.

Reaction Solution

The reaction solution used in the present invention comprises at least a polyvalent metal salt, ammonia, and benzotriazole or a benzotriazole derivative.

As described above, the polyvalent metal salt is considered to break the state of dispersion of a colorant and other ingredients contained in the ink composition, resulting in agglomeration of these ingredients. According to a preferred embodiment of the present invention, the polyvalent metal salt is a salt that is constituted by divalent or higher polyvalent metallic ions and anions bonded to the polyvalent metallic ions and is soluble in water. Specific examples of polyvalent metallic ions include divalent metallic ions, such as $Ca^{2+}$, $Cu^{2+}$, $Ni^{2+}$, $Mg^{2+}$, $Zn^{2+}$, and $Ba^{2+}$, trivalent metallic ions, such as $Al^{3+}$, $Fe^{3+}$, and $Cr^{3+}$. Anions include $Cl^-$, $NO_3^-$, $I^-$, $Br^-$, $ClO_3^-$, and $CH_3COO^-$.

A metal salt constituted by $Ca^{2+}$ or $Mg^{2+}$ provides favorable results in terms of pH of the reaction solution and the quality of prints.

The concentration of the polyvalent metal salt in the reaction solution may be suitably determined so as to attain the effect of providing good print quality and preventing clogging. It, however, is preferably about 0.1 to 40% by weight, more preferably about 5 to 25% by weight.

According to a preferred embodiment of the present invention, the polyvalent metal salt is constituted by divalent or higher polyvalent metallic ions and nitrate ions or carboxylate ions bonded to the polyvalent metallic ions and is soluble in water.

In this case, preferably, the carboxylate ions are derived from a saturated aliphatic monocarboxylic acid having 1 to 6 carbon atoms or a carbocyclic monocarboxylic acid having 7 to 11 carbon atoms. Preferred examples of the saturated aliphatic monocarboxylic acid having 1 to 6 carbon atoms include formic acid, acetic acid, propionic acid, butyric acid, isobutyric acid, valeric acid, isovaleric acid, pivalic acid, and hexanoic acid. Among them, formic acid and acetic acid are particularly preferred.

A hydrogen atom(s) on the saturated aliphatic hydrocarbon group in the monocarboxylic acid may be substituted by a hydroxyl group. Preferred examples of such carboxylic acids include lactic acid.

Preferred examples of the carbocyclic monocarboxylic acid having 6 to 10 carbon atoms include benzoic acid and naphthoic acid with benzoic acid being more preferred.

The reaction solution according to the present invention further contains ammonia. The amount of ammonia added may be properly determined so that good print quality, printing stability, and storage stability can be provided, while taking pH of the reaction solution into consideration. The amount of ammonia added, however, is preferably about not more than 0.5% by weight, more preferably not more than 0.3% by weight.

The reaction solution according to the present invention further contains benzotriazole or a benzotriazole derivative. The term "benzotriazole derivative" used herein refers to salts of benzotriazole, compounds, with a benzotriazole structure, having substituents, for example, $C_{1-6}$ alkyl (preferably methyl and ethyl), hydroxyl, carboxyl, and phenyl groups, and salts of the compounds. Specific examples of benzotriazole derivatives usable herein include sodium salt of 1,2,3-benzotriazole, potassium salt of 1,2,3-benzotriazole, tolyltriazole, potassium salt of tolyltriazole, tolyltriazoleamine, and 2-(2'-hydroxy-5-methylphenyl) benzotriazole.

According to a preferred embodiment of the present invention, the benzotriazole derivative has such a solubility that not less than 0.03 g of the benzotriazole derivative can be dissolved in 100 g of water.

The amount of benzotriazole or the benzotriazole derivative added may be properly determined so that the effect of benzotriazole or the benzotriazole derivative can be attained. According to a preferred embodiment of the present invention, however, the amount is preferably not less than 0.03% by weight, more preferably not less than 0.05% by weight.

According to a preferred embodiment of the present invention, the pH value of the reaction solution is preferably not less than 8, more preferably 8 to 10.

According to a preferred embodiment of the present invention, the reaction solution may further contain a polyol. The polyol has a vapor pressure of not more than 0.01 mmHg at 20° C., and the amount of the polyol added is not less than 10% by weight, more preferably about 10 to 30% by weight, based on the reaction solution. Specific examples of preferred polyols usable herein include polyhydric alcohols, for example, glycerin, diethylene glycol, triethylene glycol, 1,5-pentanediol, and 1,4-butanediol. Further specific examples of preferred polyols include saccharides, for example, monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. These polyols may be added alone or as a mixture of two or more.

According to a preferred embodiment of the present invention, the reaction solution may further contain a wetting agent comprised of a high-boiling organic solvent. The high-boiling organic solvent functions to prevent the reaction solution from drying out, thereby preventing clogging of the head.

Preferred examples of high-boiling organic solvents, some of which are those described above in connection with the polyol, include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; and 1,3-dimethyl-2-imidazolidinone.

Although the amount of the high-boiling organic solvent added is not particularly limited, it is preferably about 0.5 to 40% by weight, more preferably about 2 to 20% by weight.

According to a preferred embodiment of the present invention, the reaction solution may further contain a nonvolatile organic amine for adjusting pH. Nonvolatile organic amines usable herein include monoethanolamine, monoisopropanolamine, ethylmonoethanolamine, dimethanolamine, dimethylethanolamine, diethylethanolamine, triethanolamine, and morpholine. Although the amount of the nonvolatile amine added may be properly determined by taking into consideration the pH value of the reaction solution, the amount is preferably about 0.1 to 2.0% by weight.

Ink Composition

The ink composition used in the present invention comprises a colorant, an organic solvent, water, and preferably a resin emulsion and other additives.

Preferably, the colorant contained in the ink composition can be reacted with the polyvalent metal salt in the reaction solution to form an agglomerate. The colorant may be either a dye or a pigment with the pigment being preferred.

Dyes usable herein include various dyes commonly used in ink jet recording, such as direct dyes, acid dyes, foodstuff dyes, basic dyes, reactive dyes, disperse dyes, vat dyes, soluble vat dyes, and reactive disperse dyes.

Regarding the pigment, inorganic and organic pigments are usable. Examples of the inorganic pigment include, in addition to titanium oxide and iron oxide, carbon blacks produced by known processes, such as contact, furnace, and thermal processes. Examples of the organic pigment include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

According to a preferred embodiment of the present invention, the above pigment is added, to the ink, in the form of a pigment dispersion prepared by dispersing the pigment in an aqueous medium with the aid of a dispersant or a surfactant. Preferred dispersants include those commonly used in the preparation of a dispersion of a pigment, for example, a polymeric dispersant. In this connection, that the dispersant and the surfactant contained in the dispersion of the pigment function also as the dispersant and the surfactant for the ink composition will be apparent to a person having ordinary skill in the art.

The amount of the pigment added to the ink is preferably about 0.5 to 25% by weight, more preferably about 2 to 15% by weight.

According to a preferred embodiment of the present invention, the ink composition contains a resin emulsion. The term "resin emulsion" used herein refers to an emulsion comprising water as a continuous phase and the following resin component as a dispersed phase. Resin components as the dispersed phase include acrylic resin, vinyl acetate resin, styrene/butadiene resin, vinyl chloride resin, acrylate/styrene resin, butadiene resin, styrene resin, crosslinked acrylic resin, crosslinked styrene resin, benzoguanamine resin, phenolic resin, silicone resin, and epoxy resin.

According to a preferred embodiment of the present invention, the resin is a polymer having a combination of a hydrophilic segment with a hydrophobic segment. The particle diameter of the resin component is not particularly limited so far as the resin component can form an emulsion. It, however, is preferably not more than about 150 nm, more preferably about 5 to 100 nm.

The resin emulsion may be prepared by dispersion polymerization of a resin monomer, optionally together with a surfactant, in water. For example, an emulsion of acrylic resin or styrene/acryl resin may be prepared by subjecting an ester of (meth)acrylic acid or alternatively an ester of (meth)acrylic acid in combination with styrene to dispersion polymerization in water in the presence of a surfactant. In general, the mixing ratio of the resin component to the surfactant is preferably about 10:1 to 5:1.

Examples of preferred surfactants usable herein include anionic surfactants (for example, sodium dodecylbenzenesulfonate, sodium laurylate, and ammonium salt of polyoxyethylene alkyl ether sulfates), nonionic surfactants (for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides). They may be used alone or in combination of two or more. Further, acetylene glycol (OLFINE Y and Surfynol 82, 104, 440, 465, and 485 (all the above products being manufactured by Air Products and Chemicals Inc.) may also be used.

The ratio of the resin as the component constituting the dispersed phase to water is suitably 60 to 400 parts by weight based on 100 parts by weight of the resin with 100 to 200 parts by weight, based on 100 parts by weight of the resin, of water being preferred.

Known resin emulsions may also be used as the above resin emulsion. For example, resin emulsions described in Japanese Patent Publication No. 1426/1987 and Japanese Patent Laid-Open Nos. 56573/1991, 79678/1991, 160068/1991, and 18462/1992 as such may be used as the resin emulsion in the present invention.

Further, commercially available resin emulsions may also be used, and examples thereof include Microgel E-10002 and E-5002 (emulsion of styrene/acrylic resin, manufactured by Nippon Paint Co., Ltd.), Voncoat 4001 (emulsion of acrylic resin, manufactured by Dainippon Ink and Chemicals, Inc.), Voncoat 5454 (emulsion of styrene/acrylic resin, manufactured by Dainippon Ink and Chemicals, Inc.), SAE-1014 (emulsion of styrene/acrylic resin, manufactured by Nippon Zeon Co., Ltd.), and Saivinol SK-200 (emulsion of acrylic resin, manufactured by Saiden Chemical Industry Co., Ltd.).

In the ink composition used in the present invention, the amount of the resin emulsion incorporated therein is preferably such that the amount of the resin component is in the range of from 0.1 to 40% by weight, more preferably in the range of from 1 to 25% by weight, based on the ink composition.

The resin emulsion, by virtue of the interaction with the polyvalent metal ion as the reactant, has the effect of inhibiting the penetration of a coloring component and, further, accelerating the fixation of the coloring component on the recording medium. Further, some resin emulsions have an additional effect that they form a film on the recording medium to improve the rubbing/scratch resistance of the prints.

According to a preferred embodiment of the present invention, the ink composition used in the present invention may further contain a wetting agent comprised of a high-boiling organic solvent.

Preferred examples of high-boiling organic solvents usable herein include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; 1,3-dimethyl-2-imidazolidinone; and triethanolamine.

The amount of the wetting agent is preferably about 0.5 to 40% by weight, more preferably about 2 to 20% by weight, based on the ink. Further, preferably, the ink composition used in the present invention further contains a low-boiling organic solvent. Examples of low-boiling organic solvents usable herein include methanol, ethanol, n-propyl alcohol, iso-propyl alcohol, n-butanol, sec-butanol, tert-butanol, iso-butanol, and n-pentanol. Monohydric alcohols are particularly preferred.

The amount of the low-boiling organic solvent added is preferably 0.5 to 10% by weight, more preferably 1.5 to 6% by weight, based on the ink.

According to a preferred embodiment of the present invention, the ink composition used in the present invention contains a saccharide. Specific examples of saccharide usable herein include monosaccharide, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. The term "polysaccharide" used herein means saccharides in the broad sense as including substances which exist widely in the world of nature, such as alginic acid, α-cyclodextrin, and cellulose.

Derivatives of these saccharides usable herein include reducing sugars of the above saccharides (for example, sugar alcohols represented by the general formula $HOCH_2(CHOH)_nCH_2OH$, wherein n is an integer of 2 to 5), oxidizing sugars (for example, aldonic acid or uronic acid), amino acids, and thiosugars. Among them, sugar alcohols are particularly preferred, and specific examples thereof include maltitol and sorbitol.

The content of the saccharide is suitably 0.1 to 40% by weight, preferably 0.5 to 30% by weight, based on the ink composition.

If necessary, pH adjustors, preservatives, antimolds and the like may be added to the ink composition.

Ink Jet Recording Apparatus

An ink jet recording apparatus for carrying out the ink jet recording method according to the present invention will be described with reference to the accompanying drawings.

Figure 1:
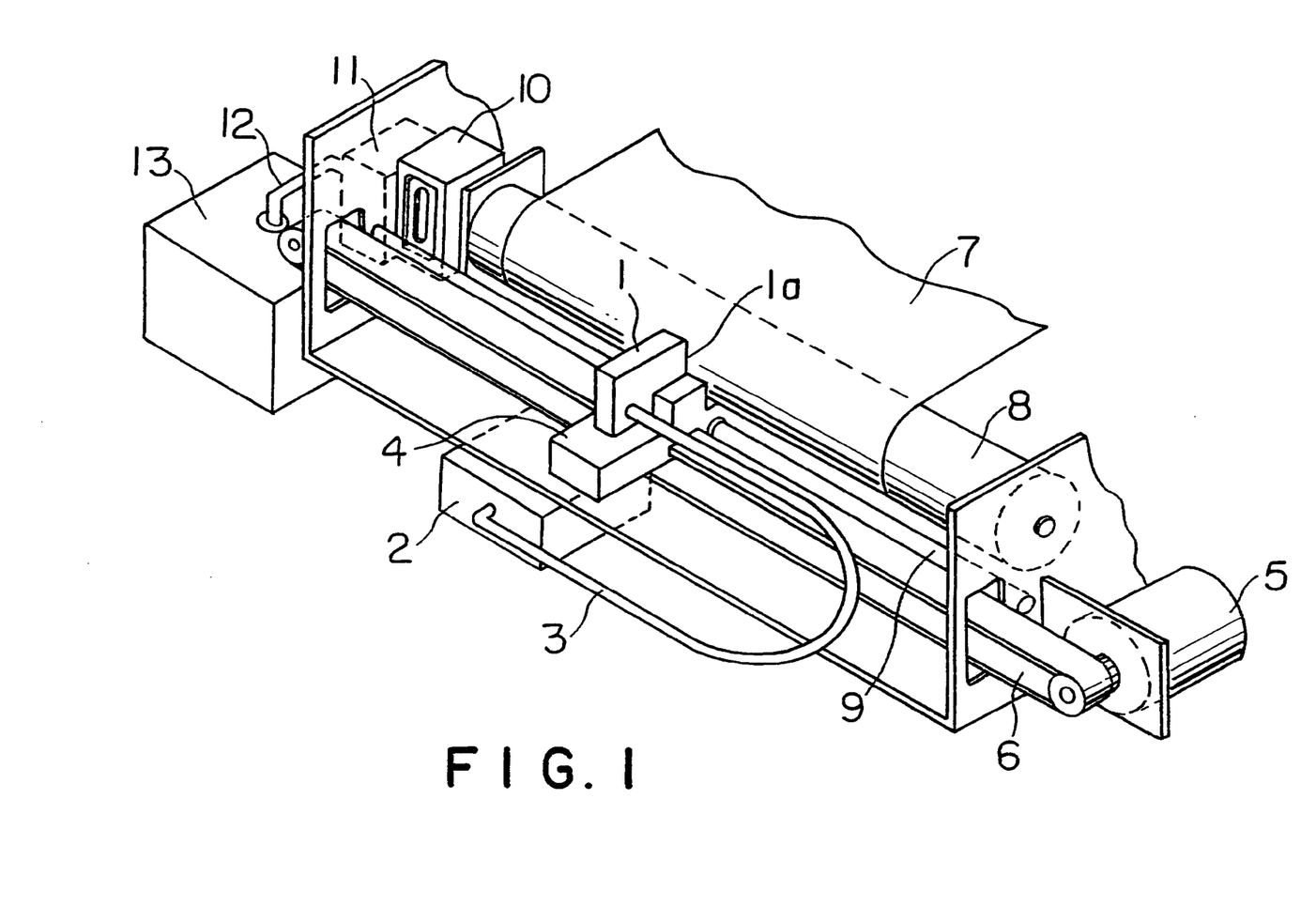
FIG. 1 is a diagram showing a preferred ink jet recording apparatus usable in practicing the ink jet recording method according to the present invention, wherein a recording head is provided separately from an ink tank to feed an ink composition and a reaction solution into a recording head through an ink tube.

FIG. 1 is a diagram showing an embodiment of an ink jet recording apparatus. In the apparatus according to this embodiment, an ink composition and a reaction solution are accommodated in a tank and fed into a recording head through an ink tube. Specifically, a recording head 1 is communicated with an ink tank 2 through an ink tube 3. In this case, the interior of the ink tank 2 is partitioned, and a chamber for an ink composition, optionally a plurality of chambers respectively for a plurality of color ink compositions, and a chamber for a reaction solution are provided.

The recording head 1 is moved along a carriage 4 by means of a timing belt 6 driven by a motor 5. On the other hand, paper 7 as a recording medium is placed by a platen 8 and a guide 9 at a position facing the recording head 1. In this embodiment, a cap 10 is provided. A suction pump 11 is connected to the cap 10 in order to conduct the so-called "cleaning operation." The ink composition sucked by the suction pump 11 is resorvoired in a waste ink tank 13 through a tube 12.

Figure 2:
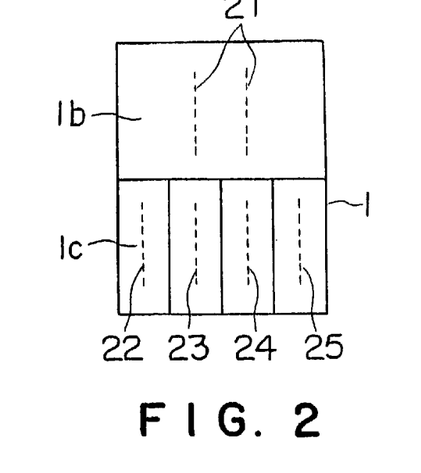
FIG. 2 is an enlarged view showing the surface of nozzles for a recording head, wherein reference character 1b designates the surface of a nozzle for a reaction solution and 1c the surface of a nozzle for an ink composition.

FIG. 2 is an enlarged view showing the surface of nozzles for the recording head 1. In the drawing, the surface of a nozzle for a reaction solution is indicated by 1*b*, and a nozzle 21 for ejecting the reaction solution is provided in the longitudinal direction. On the other hand, the surface of nozzles for the ink composition is indicated by 1*c*, and a yellow ink composition, a magenta ink composition, a cyan ink composition, and a black ink composition are ejected respectively through nozzles 22, 23, 24 and 25.

As described above, the reaction solution according to the present invention does not attack a nozzle plate which has been rendered water repellent by eutectoid plating. Therefore, the ink jet recording method according to the present invention can be advantageously applied to an ink jet recording apparatus using a nozzle plate having a water-repellent layer formed by eutectoid plating. Preferably, this water-repellent layer is formed by immersing a nozzle plate 1 in an electrolyte, with nickel ions and particles of such a water-repellent polymeric resin as polytetrafluoroethylene dispersed therein, and forming a eutectoid plating on the surface of the nozzle plate while stirring the electrolyte. Fluoropolymeric materials usable in the eutectoid plating include resins, such as polytetrafluoroethylene, polyperfluoroalkoxybutadiene, polyfluorovinylidene, polyfluorovinyl, and polydiperfluoroalkyl fumarate. These resins may be used alone or as a mixture of two or more.

Figure 3:
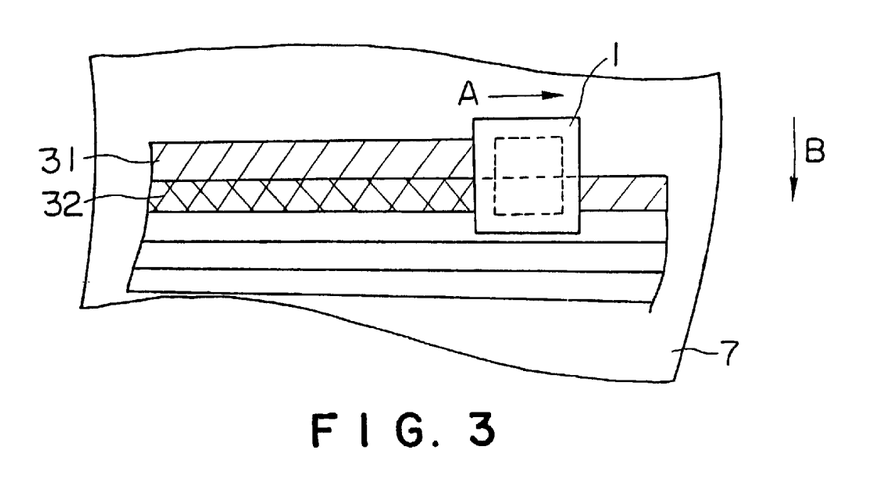
FIG. 3 is a diagram illustrating ink jet recording using the recording head shown in FIG. 2, wherein numeral 31 designates a region where a reaction solution has been deposited and numeral 32 a printed region where an ink composition has been printed on the deposited reaction solution.

Further, an ink jet recording method using the recording head shown in FIG. 2 will be described with reference to FIG. 3. The recording head 1 is moved in the direction indicated by an arrow A, during which time the reaction solution is ejected through the nozzle surface 1b to form a reaction solution-deposited region 31 in a band form on the recording medium 7. Subsequently, the recording medium 7 is transferred by a predetermined extent in the paper feed direction indicated by an arrow B, during which time the recording head 1 is moved in the direction opposite to that indicated by the arrow A in the drawing and returned to the left end of the recording medium 7, and the recording head 1 conducts printing using the ink composition on the reaction solution-deposited region, thereby forming a print region 32.

Figure 4:
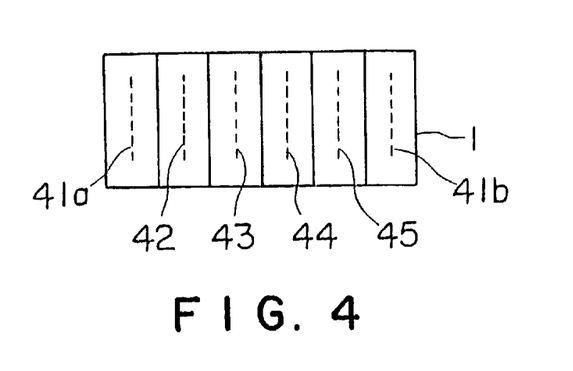
FIG. 4 is a diagram showing another preferred embodiment of the recording head usable in practicing the ink jet recording method according to the present invention, wherein all ejection nozzles are arranged in lateral direction.

Further, as shown in FIG. 4, in the recording head 1, it is also possible to arrange all nozzles in the lateral direction to construct a nozzle assembly. In the drawing, ejection nozzles for a reaction solution are denoted by 41a and 41b, and a yellow ink composition, a magenta ink composition, a cyan ink composition, and a black ink composition are ejected respectively through nozzles 42, 43, 44 and 45. In the recording head according to this embodiment, the recording head 1, when reciprocated on the carriage, can conduct printing in both directions. Therefore, in this case, printing at a higher speed is expected as compared with the case where the recording head shown in FIG. 2 is used.

Regulating the surface tension of the reaction solution and the ink composition preferably by the above method enables a high-quality print to be more stably provided independently of the order of depositing the reaction solution and the ink composition. In this case, use of only one ejection nozzle for the reaction solution suffices for desired results (for example, the nozzle indicated by numeral 41b in the drawing may be omitted), leading to a further reduction in size of head and an increase in printing speed.

In the ink jet recording apparatus, the supplement of the ink composition may be carried out by replacing a cartridge as an ink tank. The ink tank may be integral with the recording head.

Figure 5:
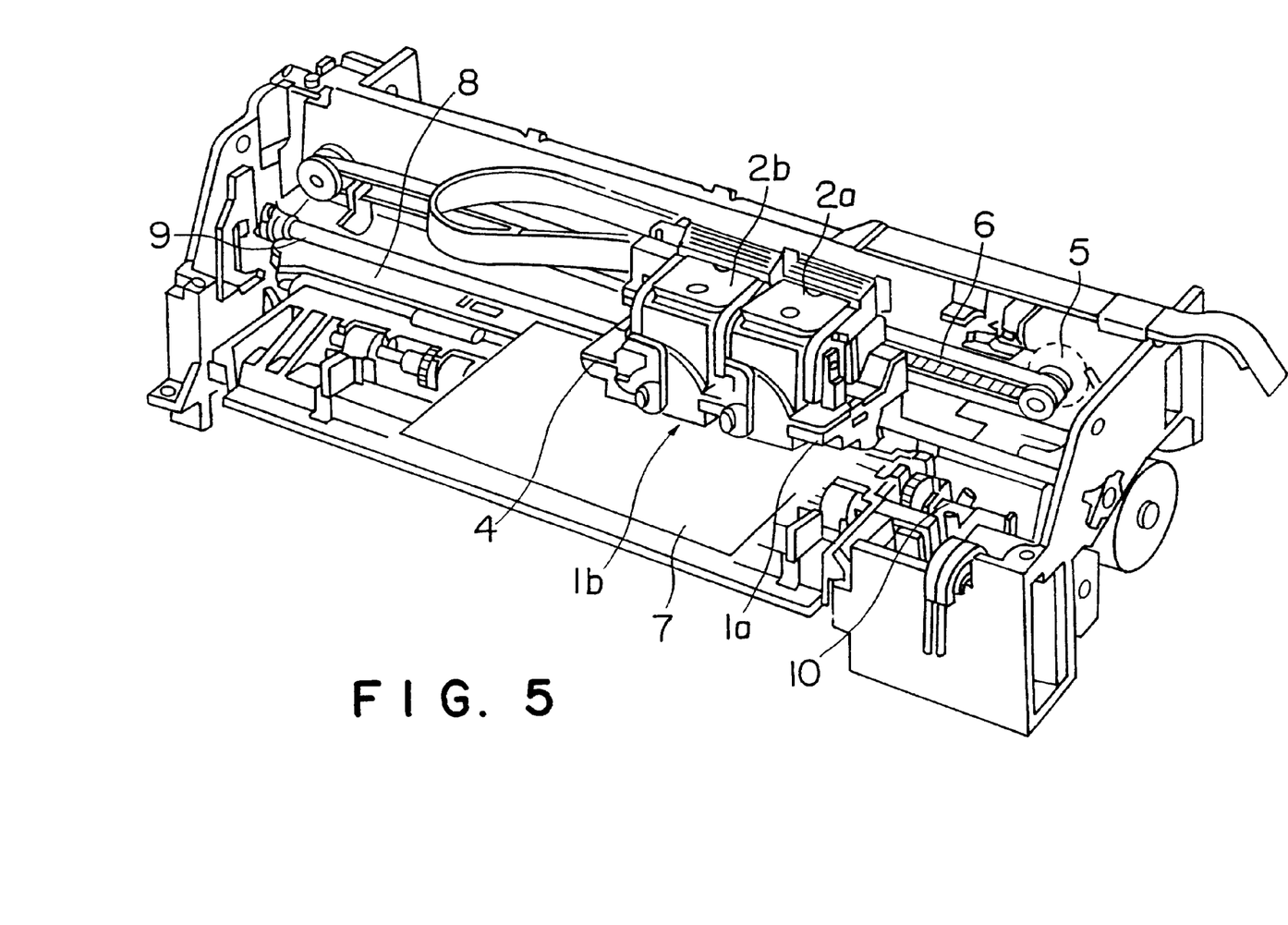
FIG. 5 is a diagram showing a preferred ink jet recording apparatus usable in practicing the ink jet recording method according to the present invention, wherein: a recording head is integral with an ink tank.

A preferred embodiment of an ink jet recording apparatus using such an ink tank is shown in FIG. 5. In the drawing, the same members as used in the apparatus shown in FIG. 1 have the same reference numerals. In the embodiment shown in FIG. 5, recording heads 1a and 1b are integral respectively with ink tanks 2a and 2b. An ink composition and a reaction solution are ejected respectively through the recording heads 1a and 1b. Basically, printing may be conducted in the same manner as described above in connection with the apparatus shown in FIG. 1. Further, in this embodiment, the recording head 1a is moved together with the ink tank 2a on a carriage 4, while the recording head 1b is moved together with the ink tank 2b on the carriage 4.

EXAMPLES

The present invention will be described in more detail with reference to the following examples, though it is not limited to these examples only.

The following ink compositions and reaction solutions were prepared by conventional methods. Specifically, regarding the production of the ink compositions, the colorant component, together with the dispersant component, was dispersed, other ingredients were added to the dispersion, they were mixed together, and insolubles having a given size or larger were then removed by filtration.

Reaction solution 1

| | |
|---|---|
| Magnesium nitrate hexahydrate | 25 wt % |
| Triethylene glycol monobutyl ether | 10 wt % |
| Glycerin | 10 wt % |
| Aqueous ammonia (29%) | 0.5 wt % |
| Benzotriazole | 0.03 wt % |
| Ion-exchanged water | Balance |
| pH = 8.4 | |

Reaction solution 2

| | |
|---|---|
| Magnesium acetate tetrahydrate | 25 wt % |
| Triethylene glycol monobutyl ether | 10 wt % |
| Glycerin | 10 wt % |
| Aqueous ammonia (29%) | 0.5 wt % |
| Benzotriazole | 0.03 wt % |
| Ion-exchanged water | Balance |
| pH = 8.7 | |

Reaction solution 3

| | |
|---|---|
| Calcium nitrate tetrahydrate | 25 wt % |
| Triethylene glycol monobutyl ether | 10 wt % |
| Glycerin | 10 wt % |
| Aqueous ammonia (29%) | 0.6 wt % |
| Ion-exchanged water | Balance |
| pH = 8.8 | |

Reaction solution 4

| | |
|---|---|
| Magnesium nitrate hexahydrate | 25 wt % |
| Triethylene glycol monobutyl ether | 10 wt % |
| Glycerin | 10 wt % |
| Benzotriazole | 0.01 wt % |
| Ion-exchanged water | Balance |
| pH = 7.5 | |

Reaction solution 5

| | |
|---|---|
| Calcium nitrate tetrahydrate | 25 wt % |
| Triethylene glycol monobutyl ether | 10 wt % |
| Glycerin | 10 wt % |
| Ion-exchanged water | Balance |
| pH = 7.4 | |

Reaction solution 6

| | |
|---|---|
| Magnesium nitrate hexahydrate | 25 wt % |
| Triethylene glycol monobutyl ether | 10 wt % |
| Glycerin | 10 wt % |
| Benzotriazole | 0.03 wt % |
| Ion-exchanged water | Balance |
| pH = 7.5 | |

The above ingredients were mixed together. The mixtures was stirred at room temperature for 30 min and then filtered through a 5-μm membrane filter to prepare reaction solutions 1 to 5.

| Ink 1 | |
|---|---|
| Carbon black MA7 (manufactured by Mitsubishi Kasei Corp.) | 5 wt % |
| Liquid medium | |
| Styrene/acryl copolymer ammonium salt (molecular weight 7000, resin component 38 wt %, dispersant) | 1.5 wt % |
| Voncoat 4001 (acrylic resin emulsion, resin component 50%, manufactured by Dainippon Ink and Chemicals, Inc.) | 3 wt % |
| Maltitol | 3.5 wt % |
| Glycerin | 10 wt % |
| 2-Pyrrolidone | 2 wt % |
| Ion-exchanged water | Balance |

Carbon black and the dispersant were mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed, the other additives were added, and the mixture was stirred at room temperature for 20 min. The mixture was filtered through a 5-μm membrane filter to prepare an ink for ink jet recording.

Evaluation 1

Storage Stability of Reaction Solution

Reaction solutions 1 to 5 (100 g) were placed in sample bottles, and the sample bottles were then hermetically sealed and, in this state, were allowed to stand in an environment of temperature 40° C. and humidity 25% for one week. The reaction solutions after the standing were passed through a 5-μm membrane filter. In this case, the reaction solutions were inspected for the presence of sediments and the filtrability. The results were evaluated according to the following criteria.

A: Creation of no sediment, and smooth filtration (the filtrability being equal to that immediately after the preparation of the reaction solution)
   B: Creation of small amount of sediment, and smooth filtration
   C: Creation of large amount of sediment, and unsmooth filtration Evaluation 2

Print Quality (Feathering)

Printing was performed on two papers of Xerox 4024 3R 721 (manufactured by Xerox Corp.) and Xerox R (recycled paper, manufactured by Xerox Corp.) by means of an ink jet printer MJ-500C (manufactured by Seiko Epson Corp.). The reaction solution was first printed (100% duty) on the papers, and letters were then printed using ink 1. After drying, the letters were inspected for feathering. The results were evaluated according to the following criteria.

A: Sharp print free from feathering for both the papers
   B: Feathering created for any one of or both the papers
   C: Remarkable feathering to render the outline of the letter blurry for any one of or both the papers Evaluation 3

Ejection Stability

The head of an ink jet printer MJ-500C was filled with the reaction solution, and alphabetical letters were continuously printed on paper of size A4. When a reaction solution trajectory directionality problem occurred during printing, recovery operation was performed. When the directionality problem could not be solved by the recovery operation, the number of sheets of the paper printed up to that time was determined as an index of the ejection stability. The results were evaluated according to the following criteria.

AA: Not less than 20,000 sheets
   A: 10,000 to less than 20,000 sheets
   B: 5,000 to less than 10,000 sheets
   C: Less than 5,000 sheets The results of evaluations 1 to 3 were as summarized in Table 1.

TABLE 1

| | Reaction solution | Evaluation 1 | Evaluation 2 | Evaluation 3 |
|---|---|---|---|---|
| Example 1 | 1 | A | A | A |
| Example 2 | 2 | A | A | AA |
| Example 3 | 3 | B | A | B |
| Example 4 | 4 | B | A | B |
| Example 5 | 5 | B | A | C |
| Example 6 | 6 | B | A | B |

Evaluation 4

Recording heads of an ink jet printer MJ-500C was filled respectively with reaction solutions 1 and 5. After ejection of the reaction solutions through all the nozzles without any problem was confirmed, the recording heads were capped, and, in this state, were allowed to stand in an environment of 40° C. for one week. After the standing, the recording heads were taken out of the printer, and the nozzle face, which had been subjected to eutectoid plating, was observed under a microscope. As a result, the nozzle face filled with reaction solution 1 remained unchanged, whereas the nozzle face filled with reaction solution 5 was found to be corroded.

What is claimed is:

1. A reaction solution for an ink jet recording method wherein droplets of an ink composition and droplets of a reaction solution, which produces an agglomerate upon contact with the ink composition, are ejected and deposited onto a recording medium to perform printing, the reaction solution comprising a polyvalent metal salt, ammonia, and benzotriazole or a benzotriazole derivative.

2. The reaction solution according to claim 1, wherein the concentration of ammonia in the reaction solution is not more than 0.5% by weight.

3. The reaction solution according to claim 1, wherein the concentration of benzotriazole or the benzotriazole derivative in the reaction solution is not less than 0.03% by weight.

4. The reaction solution according to claim 1, wherein the concentration of ammonia in the reaction solution is not more than 0.5% by weight with the concentration of benzotriazole or the benzotriazole derivative in the reaction solution being not less than 0.03% by weight.

5. The reaction solution according to claim 4, wherein the polyvalent metal salt is magnesium acetate.

6. The reaction solution according to claim 1 which has a pH value of not less than 8.

7. An ink jet recording method comprising the steps of:
   ejecting droplets of an ink composition and droplets of a reaction solution which produces an agglomerate upon contact with the ink composition; and depositing the droplets of the ink composition and the droplets of the reaction solution onto a recording medium to perform printing, wherein the reaction solution is one according to claim 1.

8. The ink jet recording method according to claim 7, wherein the reaction solution is ejected through an ink jet recording head provided with a nozzle plate having thereon a eutectoid plating.

9. A recorded medium obtained by the method according to claim 7.

10. The reaction solution according to claim 1, wherein the polyvalent metal salt is present in the reaction solution in an amount of about 0.1 to 40% by weight and the ammonia and benzotriazole or benzotriazole derivative are present in the reaction solution in respective amounts such that the reaction solution has a storage stability, ejection stability or both that is improved as compared with the reaction solution without the ammonia or the benzotriazole or benzotriazole derivative.

11. The reaction solution according to claim 10, wherein the ammonia is present in the reaction solution in an amount of not more than 0.5% by weight.

12. The reaction solution according to claim 11, wherein the benzotriazole or benzotriazole derivative is present in the reaction solution in an amount of not less than 0.03% by weight.

13. The reaction solution according to claim 12, wherein polyvalent metal salt is present in the reaction solution in an amount of about 5 to 25% by weight.

14. The reaction solution according to claim 13, wherein the reaction solution further comprises a polyol in an amount of about 10 to 30% by weight.

15. The reaction solution according to claim 14, wherein the reaction solution comprises a high-boiling organic solvent in an amount of about 0.5% to 40% by weight.

16. An ink jet recording method comprising the steps of: ejecting droplets of an ink composition and droplets of a reaction solution which produces an agglomerate upon contact with the ink composition; and depositing the droplets of the ink composition and the droplets of the reaction solution onto a recording medium to perform printing, wherein the reaction solution is one according to claim 10.

17. The ink jet recording method according to claim 16, wherein the reaction solution is ejected through an ink jet recording head provided with a nozzle plate having thereon a eutectoid plating.

18. A recorded medium obtained by the method according to claim 16.

19. A reaction solution consisting essentially of components that allow stable ejection of the reaction solution from an ink jet nozzle and that collectively produce an agglomerate upon contact of the reactant solution with an ink composition comprising a dispersed colorant, said components comprising a polyvalent metal salt, ammonia and benzotriazole or a benzotriazole derivative, said polyvalent metal salt being present in the reaction solution in an amount of about 0.1 to 40% by weight and the ammonia and benzotriazole or benzotriazole derivative being present in the reaction solution in respective amounts such that the reaction solution has a storage stability, ejection stability or both that is improved as compared with the reaction solution without the ammonia or the benzotriazole or benzotriazole derivative.

\* \* \* \* \*